United States Patent
Wu et al.

(10) Patent No.: US 10,771,733 B2
(45) Date of Patent: Sep. 8, 2020

(54) METHOD AND APPARATUS FOR PROCESSING VIDEO PLAYING

(71) Applicant: Hangzhou Hikvision Digital Technology Co., Ltd., Hangzhou (CN)

(72) Inventors: Yang Wu, Hangzhou (CN); Bingquan Han, Hangzhou (CN); Xiaojun Chen, Hangzhou (CN); Chunyu Xu, Hangzhou (CN); Zheng Huang, Hangzhou (CN)

(73) Assignee: Hangzhou Hikvision Digital Technology Co. Ltd., Hangzhou (CN)

( * ) Notice: Subject to any disclaimer, the term of this patent is extended or adjusted under 35 U.S.C. 154(b) by 0 days.

(21) Appl. No.: 16/335,577

(22) PCT Filed: Aug. 23, 2017

(86) PCT No.: PCT/CN2017/098664
§ 371 (c)(1),
(2) Date: Mar. 21, 2019

(87) PCT Pub. No.: WO2018/059165
PCT Pub. Date: Apr. 5, 2018

(65) Prior Publication Data
US 2020/0021773 A1    Jan. 16, 2020

(30) Foreign Application Priority Data

Sep. 30, 2016   (CN) .......................... 2016 1 0871962

(51) Int. Cl.
*H04N 5/92*    (2006.01)
*G11B 27/36*   (2006.01)
(Continued)

(52) U.S. Cl.
CPC ............... *H04N 5/92* (2013.01); *G11B 27/36* (2013.01); *H04N 5/268* (2013.01); *H04N 5/44591* (2013.01)

(58) Field of Classification Search
None
See application file for complete search history.

(56) References Cited

U.S. PATENT DOCUMENTS

2007/0274400 A1*  11/2007  Murai ............ H04N 21/234309
                                           375/240.26
2009/0051813 A1    2/2009  Sasao et al.
(Continued)

FOREIGN PATENT DOCUMENTS

CN    101094318 A    12/2007
CN    101207757 A    6/2008
(Continued)

OTHER PUBLICATIONS

International Search Report for International Application No. PCT/CN2017/098664 dated Nov. 15, 2017.

*Primary Examiner* — Eileen M Adams
(74) *Attorney, Agent, or Firm* — Clements Bernard Walker; Seth L. Hudson (57) ABSTRACT

Embodiments of the application disclose a method and apparatus for processing video playing, and relate to the technology field of video. The method includes: obtaining an adjustment instruction for a first video being played; determining whether the first video is being recorded; if the first video is being recorded, acquiring and storing a bit stream of the first video based on a current bit stream type of the first video. With the embodiment of the application, the complete recording of a video is ensured.

9 Claims, 3 Drawing Sheets

(51) Int. Cl.
*H04N 5/268* (2006.01)
*H04N 5/445* (2011.01)

(56) References Cited

U.S. PATENT DOCUMENTS

2012/0062473 A1    3/2012   Xiao et al.
2012/0192223 A1*   7/2012   Kao ................. H04N 5/765
                                                            725/32

FOREIGN PATENT DOCUMENTS

| CN | 201078853 Y | 6/2008 |
| CN | 101635828 A | 1/2010 |
| CN | 103369139 A | 10/2013 |
| CN | 103929611 A | 7/2014 |
| CN | 104184980 A | 12/2014 |
| CN | 105391965 A | 3/2016 |
| CN | 106899817 A | 6/2017 |
| EP | 2555517 A1 | 2/2013 |
| JP | 2007043357 A | 2/2007 |
| JP | 2008085545 A | 4/2008 |
| WO | 2005039157 A1 | 4/2005 |

* cited by examiner

METHOD AND APPARATUS FOR PROCESSING VIDEO PLAYING

The application claims the priority to a Chinese Patent Application No. 201610871962.3, filed with the China National Intellectual Property Administration on Sep. 30, 2016 and entitled "method and apparatus for processing video playing", which is incorporated into the application by reference in its entirety.

TECHNICAL FIELD

The application relates to the technology field of video, and in particular to a method and apparatus for processing video playing.

BACKGROUND

The bit stream type is a bit stream parameter rules composed of parameters (for example: resolution, frame rate, code rate, etc.) of video quality, and may include high-definition, standard-definition, smoothness and other types. The bit stream types may be ordered by the video quality as: high-definition>standard-definition>smoothness. The higher the video quality is, the higher the resolution, the code rate and the frame rate will be, and the more the hardware resources (for example: CPU (Central Processing Unit), memory, bandwidth, etc.) required for playing the video will be. The lower the video quality is, the lower the resolution, the code rate and the frame rate will be, and the less the hardware resources required for playing the video will be.

In addition, a client may be provided with many split screen modes, for example: 1-split screen mode, 4-split screen mode, 9-split screen mode, 16-split screen mode, and the like. Here, the process of playing a video in a split screen may include: acquiring a bit stream (stream-acquiring), analyzing the bit stream (decoding), and rendering the bit stream (rendering). In general, the client often needs to record a video being played, that is, store a bit stream of the video being played locally. In this case, if a video being-recorded is operated, the recording of the video will be stopped, thereby resulting in the incompletely recording of this video.

SUMMARY

Embodiments of the application disclose a method and apparatus for processing video playing, to ensure the complete recording of a video.

To achieve the above-mentioned objective, an embodiment of the application discloses a method for processing video playing, including:

obtaining an adjustment instruction for a first video being played;

determining whether the first video is being recorded; and if the first video is being recorded, acquiring and storing a bit stream of the first video based on a current bit stream type of the first video.

Optionally, the adjustment instruction for a first video being played is a hiding instruction for a first video being played; and the method further comprises: stopping the decoding and rendering of the first video.

Optionally, obtaining a hiding instruction for a first video being played, comprises:

obtaining a play control instruction;

determining whether a first video(s) being played that needs to be hidden exists, based on the play control instruction; and if the first video(s) being played that needs to be hidden exists, generating a hiding instruction for each of the first video(s).

Optionally, when the play control instruction is a split screen mode switch instruction, determining whether a first video(s) being played that needs to be hidden exists, based on the play control instruction, comprises:

when the number of split screens corresponding to a target split screen mode in the split screen mode switch instruction is smaller than the number of split screens corresponding to a current split screen mode, determining that the first video(s) being played that needs to be hidden exists.

Optionally, when a hidden first video is displayed, the method further comprises:

determining whether the hidden first video is being recorded;

if the hidden first video is being recorded, recovering the decoding and rendering of the hidden first video; and if the hidden first video is not being recorded, restarting the acquiring of the bit stream of the hidden first video, the decoding and rendering of the hidden first video.

Optionally, the adjustment instruction for a first video being played is a bit stream type switch instruction for a first video being played; and the method further comprises: continuing the decoding and rendering of the first video.

Optionally, the method further includes:

receiving a bit stream type forced-switch instruction input by a user; switching the bit stream type of the first video to a target bit stream type in the bit stream type forced-switch instruction;

determining whether the first video is being recorded; and if the first video is being recorded, generating a video-recording file for the first video based on a video that is recorded based on the bit stream type of the first video, and acquiring and storing the bit stream of the first video based on the target bit stream type; and after the recording of the first video is closed, obtaining and merging all of the video-recording files for the first video.

To achieve the above-mentioned objective, an embodiment of the application further discloses an apparatus for processing video playing, including:

an instruction obtaining unit, configured for obtaining an adjustment instruction for a first video being played;

a first video-recording determining unit, configured for determining whether the first video is being recorded;

a video processing unit, configured for, when the first video-recording determining unit determines that the first video is being recorded, acquiring and storing a bit stream of the first video based on a current bit stream type of the first video.

Optionally, the instruction obtaining unit is configured for: obtaining a hiding instruction for a first video being played; and the video processing unit is further configured for stopping the decoding and rendering of the first video.

Optionally, the instruction obtaining unit is configured for:
obtaining a play control instruction;
determining whether a first video(s) being played that needs to be hidden exists, based on the play control instruction; and
if the first video(s) being played that needs to be hidden exists, generating a hiding instruction for each of the first video(s).

Optionally, the instruction obtaining unit is configured for:
when the play control instruction is a split screen mode switch instruction, if the number of split screens corresponding to a target split screen mode in the split screen mode switch instruction is smaller than the number of split screens corresponding to a current split screen mode, determining that the first video(s) being played that needs to be hidden exists.

Optionally, the apparatus further includes:
a second video-recording determining unit, configured for when a hidden first video is displayed, determining whether the hidden first video is being recorded;
a video recovery unit, configured for, when the second video-recording determining unit determines that the hidden first video is being recorded, recovering the decoding and rendering of the hidden first video; and
a video restarting unit, configured for, when the second video-recording determining unit determines that the first video is not being recorded, restarting the requiring of the bit stream of the first video, the decoding and rendering of the first video.

Optionally, the instruction obtaining unit is configured for: obtaining a bit stream type switch instruction for a first video being played; and
the video processing unit is further configured for continuing the decoding and rendering of the first video.

Optionally, the apparatus further includes:
an instruction reception unit, configured for receiving a bit stream type forced-switch instruction input by a user;
a bit stream type switch unit, configured for switching the bit stream type of the first video to a target bit stream type in the bit stream type forced-switch instruction;
a third video-recording determining unit, configured for determining whether the first video is being recorded;
a file generation unit, configured for, when the third video-recording determining unit determines that the first video is being recorded, generating a video-recording file for the first video based on a video that is recorded based on the bit stream type of the first video, and acquiring and storing the bit stream of the first video based on the target bit stream type; and
a file merging unit, configured for, after the recording of the first video is closed, obtaining and merging all of the video-recording files for the first video.

To achieve the above-mentioned objective, an embodiment of the application further discloses an electronic device. The electronic device includes: a processor and a memory, wherein,
the memory is configured for storing an application program; and
the processor is configured for executing the application program stored in the memory, so as to implement the above-mentioned method for processing video playing.

To achieve the above-mentioned objective, an embodiment of the application further discloses an application program which, when executed, implements the above-mentioned method for processing video playing.

To achieve the above-mentioned objective, an embodiment of the application further discloses a storage medium configured for storing an application program which, when executed, implements the above-mentioned method for processing video playing.

In the embodiment of the application, an adjustment instruction for a first video being played obtained; whether the first video is being recorded is determined; if the first video is being recorded, a bit stream of the first video is acquired and stored based on a current bit stream type of the first video. It can be seen that the acquiring of the bit stream of the first video being-recorded will not be stopped, that is, the recording of the first video will not be stopped, ensuring the complete recording of the video.

BRIEF DESCRIPTION OF THE DRAWINGS

To describe the solutions of embodiments of the application or the prior art more clearly, the accompanying drawings to be used in the description of embodiments or the prior art will are described briefly below. Obviously, the accompanying drawings described below are merely drawings of some embodiments of the application. Those skilled in the art can obtain other drawings based on these accompanying drawings without creative efforts.

DETAILED DESCRIPTION

The technical solutions in the embodiments of the application will be described clearly and completely below in combination with the accompanying drawings of the application. Obviously, the embodiments described are merely a part, not all, of the embodiments of the application. All other embodiments obtained based on the embodiments of the application by those skilled in the art without any creative efforts fall into the scope of protection defined by the application.

The application will be described in detail below through specific embodiments.

Figure 1:
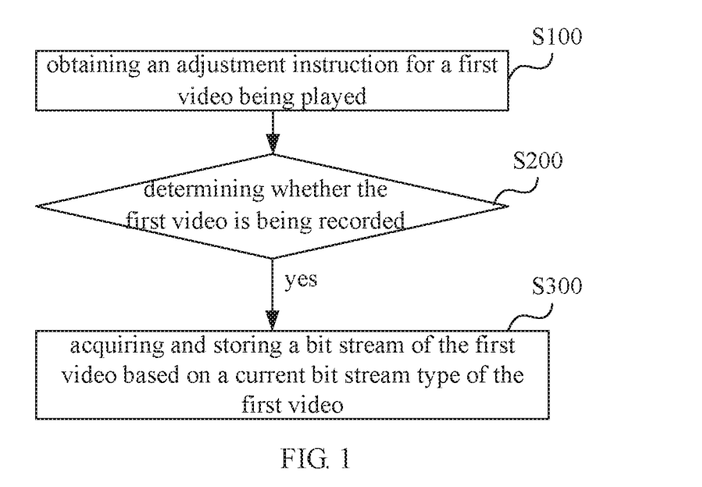
FIG. 1 is a schematic flowchart of a method for processing a video playing according to an embodiment of the application.

FIG. 1 is a schematic flowchart of a method for processing a video playing according to an embodiment of the application. The method includes S100-S300.

S100: obtaining an adjustment instruction for a first video being played.

In an embodiment of the application, the adjustment instruction may be: a video hiding instruction and a bit stream type switch instruction. Here, the bit stream type switch instruction may be generated based on a split screen mode switch instruction.

For example, the current split screen mode is a 4-split screen mode, and the target split screen mode for the split screen mode switch instruction is a 9-split screen mode.

Since the number of channels for playing videos in the 9-split screen mode is increased, in order to decrease the load on a CPU, a memory and a network, the video quality of the videos played in the 9-split screen mode may be decreased. That is, a bit stream type switch instruction is generated, and the video quality of a target bit stream type in this bit stream type switch instruction is smaller than the video quality of a bit stream type in the 4-split screen mode.

For another example, the current split screen mode is a 9-split screen mode, and the target split screen mode for the split screen mode switch instruction is a 4-split screen mode. Since the number of channels for playing videos in the 4-split screen mode is decreased, the video quality of the videos may be suitably increased. In order to obtain videos having better video quality, the video quality of the videos played in the 4-split screen mode may be increased. That is, a bit stream type switch instruction is generated based on the split screen mode switch instruction, and the video quality of a target bit stream type in this bit stream type switch instruction is larger than the video quality of a bit stream type in the 9-split screen mode.

S200: determining whether the first video is being recorded; if the first video is being recorded, performing S300.

In general, when an operation is performed on the first video being-recorded, for example, hiding the first video, switching the bit stream type of the first video, and so on, the recording of the first video is interrupted. In order to avoid the stop of the recording of the first video caused by the operation of the first video being-recorded, it is determined whether the first video is being recorded before the first video is adjusted based on the adjustment instruction.

S300: acquiring and storing the bit stream of the first video based on the current bit stream type of the first video.

For the first video being-recorded, the interruption of the recording of the first video is avoided and thus the complete recording of the video is ensured, by acquiring and storing the bit stream of the first video.

In addition, other operations may be performed on the first video being-recorded based on the obtained adjustment instruction.

In the event that the obtained adjustment instruction for a first video being played is a hiding instruction, while the bit stream of this first video is acquired and stored based on the current bit stream type of this first video, the decoding and rendering of this first video are stopped. However, for a video that is not recorded, the acquiring of the bit stream of this video, the decoding and rendering of this video may be stopped. In this way, the recording of each of hidden video(s) is ensured, and at the same time, the load on the CPU, the memory and the network is effectively decreased.

When the obtained adjustment instruction for a first video being played is a bit stream type switch instruction, the current bit stream type of this first video is not switched, that is, the bit stream of this first video is acquired and stored based on this current bit stream type of this first video, and the first video continues to be decoded and rendered.

Figure 2:
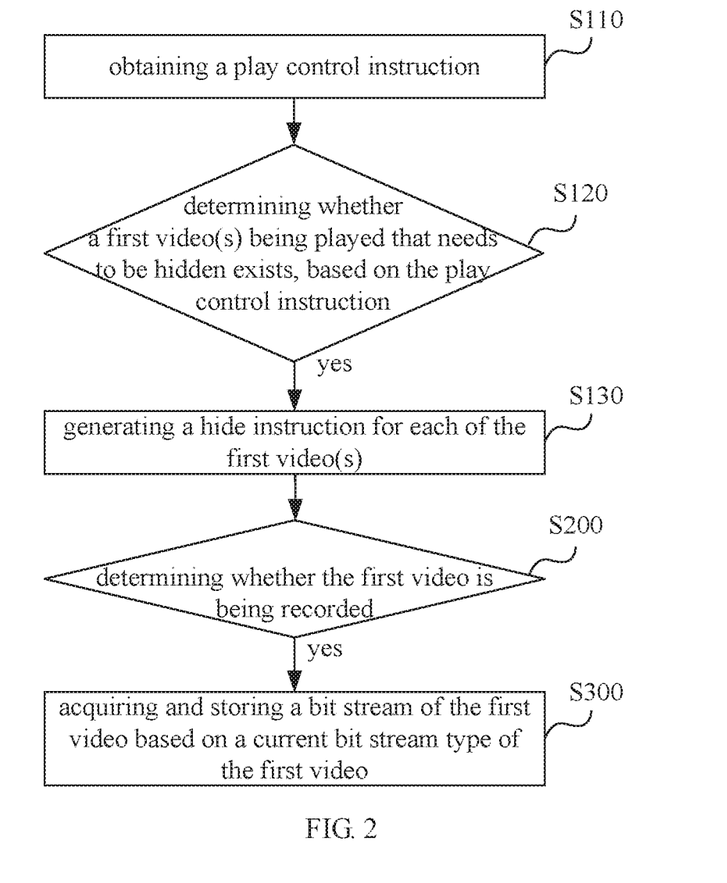
FIG. 2 is another schematic flowchart of a method for processing a video playing according to an embodiment of the application.

In an embodiment of the application, the above-mentioned hiding instruction may be obtained based on a play control instruction. Referring to FIG. 2, S100 in the method shown in FIG. 1 may include S110-S130.

S110: obtaining a play control instruction.

In an embodiment of the application, the play control instruction may include: a split screen mode switch instruction, a video hiding instruction and a bit stream type switch instruction. The bit stream type switch instruction may be generated based on the split screen mode switch instruction.

S120: determining whether a first video(s) being played that needs to be hidden exists, based on the play control instruction; if the first video(s) being played that needs to be hidden exists, performing S130.

In an embodiment of the application, when the play control instruction is a video hiding instruction, it may be determined that the target video in the video hiding instruction is a first video being played that needs to be hidden.

When the play control instruction is a split screen mode switch instruction, if the number of split screens corresponding to the target split screen mode in the split screen mode switch instruction is smaller than the number of split screens corresponding to the current split screen mode, for example, the 9-split screen mode is switched to the 4-split screen mode, the number of videos that can be displayed are decreased, and accordingly there is a first video being played that needs to be hidden.

It is assumed that split screen modes in the client include: 1-split screen mode, 4-split screen mode, 9-split screen mode and 16-split screen mode. Five videos displayed in the current split screen mode (9-split screen mode) are denoted by A, B, C, D and E, respectively. If the target split screen mode in the received split screen mode switch instruction is 1-split screen mode, the number of split screens corresponding to the target split screen mode (1-split screen mode) in the split screen mode switch instruction is smaller than the number of split screens corresponding to the current split screen mode (9-split screen mode). Thus, it may be determined that first videos being played that need to be hidden exist. If the video A is displayed, it may be determined that first videos B, C, D and E being played need to be hidden.

It should be noted that if it is determined that no first video being played that needs to be hidden exists, an operation corresponding to the play control instruction may be directly performed. For example, when the play control instruction is a split screen mode switch instruction, the current split screen mode is switched to the target split screen mode in the split screen mode switch instruction. When the play control instruction is a bit stream type switch instruction, the current bit stream type is switched to the target bit stream type in the bit stream type switch instruction.

S130: generating a hiding instruction for each of the first video(s).

If the first video(s) being played that needs to be hidden exists, a hiding instruction for each of the first video(s) is generated.

In addition, a hidden video may need to be displayed. In this case, when a hidden first video is displayed, it is determined whether this first video is being recorded. If this first video is being recorded, which indicates that the acquiring of the bit stream of this first video is ongoing, only the decoding and rendering of this first video is recovered. If this first video is not recorded, the acquiring of the bit stream of this first video, the decoding and rendering of this first video is restarted.

In general, with the switching of the split screen mode, the bit stream type of a video being played also needs to be switched. That is, it is necessary to generate a bit stream type switch instruction for a video being played (a first video) based on the split screen mode switch instruction. For example, the correspondence between a split screen mode and a bit stream type may be preset. The correspondence may generally include: a correspondence between a preset split screen mode and a default bit stream type, and a correspondence between a preset split screen mode and a supported bit stream type. The supported bit stream type includes at least one bit stream type. The supported bit stream type indicates a bit stream type that is switchable, and the default bit stream type may be one of supported bit stream types. After receiving the split screen mode switch instruction, a default bit stream type corresponding to the target split screen mode in the split screen mode switch instruction is determined based on the correspondence between the preset split screen mode and the default bit stream type, and a supported bit stream type corresponding to the target split screen mode is determined based on the correspondence between the preset split screen mode and the supported bit stream type. A bit stream type switch instruction is generated based on the determined default bit stream type and supported bit stream type, and then the bit stream type of each video that has been started is switched to one of the determined default bit stream type or supported bit stream type.

However, in general, when the bit stream type of a first video is switched, if this first video is being recorded, the recording of this first video will be stopped, thereby causing this first video not to be completely recorded. In this case, in order to ensure the complete recording of a first video being played, when a bit stream type switch instruction for the first video being played is obtained, if the bit stream type switch instruction is generated based on a split screen mode switch instruction, the bit stream type of this video may not be switched, and the first video continues to be decoded and rendered. In this way, the recording of the first video will not be stopped.

For a video that is not recorded, the bit stream type of the video may be switched to the target bit stream type in the bit stream type switch instruction to obtain a video that has better video quality.

In an embodiment of the application, a user may adjust the bit stream type of each video being played based on his requirements. In other words, an adjustment instruction for a first video being played is a bit stream type forced-switch instruction for a video being played (i.e., a first video) input by a user, and at this time, the bit stream type of the first video is switched. In this case, in order to ensure the complete recording of a video, the above-mentioned method for processing video playing according to FIG. 1 may further include the following operations shown in FIG. 3.

Figure 3:
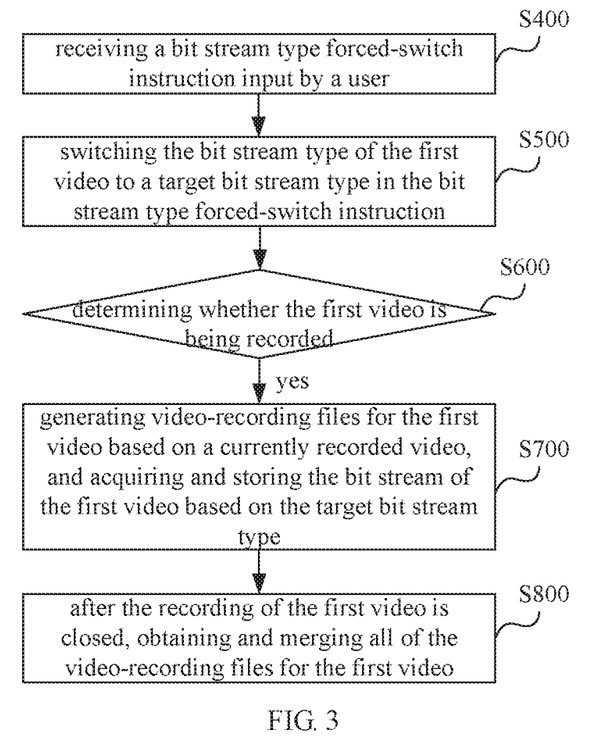
FIG. 3 is another schematic flowchart of a method for processing a video playing according to an embodiment of the application.

S400: receiving a bit stream type forced-switch instruction input by a user.

S500: switching the bit stream type of the first video to a target bit stream type in the bit stream type forced-switch instruction.

S600: determining whether the first video is being recorded; if the first video is being recorded, performing S700.

S700: generating a video-recording file for the first video based on a video that is recorded based on the bit stream type of the first video, and acquiring and storing a bit stream of the first video based on the target bit stream type.

S800: after the recording of the first video is closed, obtaining and merging all of the video-recording files for the first video.

When the bit stream type switch instruction is a bit stream type forced-switch instruction input by a user, if a first video whose bit stream type is switched is being recorded, the recording of this first video will be stopped and then restarted. Furthermore, before the recording of the first video is restarted, a video-recording file for the first video is generated based on a video that is recorded based on the bit stream type of the first video. In this case, after the recording of the first video is closed, multiple video-recording files for the first video will be generated. In order to finally ensure the completeness of the video-recording files for the first video, that is, to ensure the complete recording of this first video, after the recording of this first video is closed, all of the video-recording files for this first video are obtained and merged.

It is assumed that the current instant is 10:00, and the recording of a first video A starts from 10:00. At 10:15, the bit stream type of the first video A is switched to the bit stream type a, and thus the recording of the first video A will be interrupted, that is, stopped; and a video-recording file f1 for the first video A recorded in a period from 10:00 to 10:15 is generated and the recording of the first video A is restarted, that is, a bit stream of the first video A is acquired and stored based on the bit stream type a. At 10:25, the bit stream type of the first video A is switched to the bit stream type b, and thus the recording of the first video A is interrupted; and a video-recording file f2 for the first video A recorded in a period from 10:15 to 10:25 is generated and the recording of the first video A is restarted, that is, a bit stream of the first video A is acquired and stored based on the bit stream type b. At 10:34, the bit stream type of the first video A is switched to the bit stream type c, and thus the recording of the first video A is interrupted; and a video-recording file f3 for the first video A recorded in a period from 10:25 to 10:34 is generated and the recording of the first video A is restarted, that is, a bit stream of the first video A is acquired and stored based on the bit stream type c. At 10:50, the recording of the first video A is closed, and a video-recording file f4 for the first video A recorded in a period from 10:34 to 10:50 is generated. All of the video-recording files, including f1, f2, f3, and f4, for the first video A are obtained and merged, so as to obtain a complete video-recording file for the first video A.

With the above-mentioned embodiment, an adjustment instruction for a first video being played is obtained; whether the first video is being recorded is determined; if the first video is being recorded, a bit stream of the first video is acquired and stored based on a current bit stream type of the first video. It can be seen that the acquiring of the bit stream of the first video being-recorded will not be stopped, that is, the recording of the first video will not be stopped, ensuring the complete recording of the video.

Corresponding to the embodiment of the method, the embodiment of the application further provides an apparatus for processing video playing.

Figure 4:
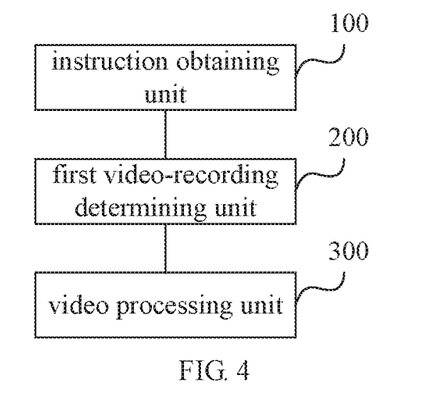
FIG. 4 is a schematic structural diagram of an apparatus for processing a video playing according to an embodiment of the application.

FIG. 4 is a schematic structural diagram of an apparatus for processing video playing according to an embodiment of the application. The apparatus includes: an instruction obtaining unit 100, configured for obtaining an adjustment instruction for a first video being played;

a first video-recording determining unit 200, configured for determining whether the first video is being recorded; and a video processing unit 300, configured for, when the first video-recording determining unit 200 determines that the first video is being recorded, acquiring and storing a bit stream of the first video based on a current bit stream type of the first video.

In an embodiment of the application, the instruction obtaining unit 100 is specifically configured for: obtaining a hiding instruction for a first video being played; and the video processing unit is further configured for stopping the decoding and rendering of the first video.

In an embodiment of the application, the instruction obtaining unit 100 is specifically configured for:

obtaining a play control instruction; determining whether a first video(s) being played that needs to be hidden exists, based on the play control instruction; and if the first video(s) being played that needs to be hidden exists, generating a hiding instruction for each of the first video(s).

In an embodiment of the application, the instruction obtaining unit 100 is specifically configured for:

when the play control instruction is a split screen mode switch instruction, if the number of split screens corresponding to a target split screen mode in the split screen mode switch instruction is smaller than the number of split screens corresponding to a current split screen mode, determining that the first video(s) being played that needs to be hidden exists.

In an embodiment of the application, the apparatus may further include: a second video-recording determining unit (not shown in FIG. 4), configured for when a hidden first video is displayed, determining whether the hidden first video is being recorded;

a video recovery unit (not shown in FIG. 4), configured for, when the second video-recording determining unit determines that the hidden first video is being recorded, recovering the decoding and rendering of the hidden first video;

a video restarting unit (not shown in FIG. 4), configured for, when the second video-recording determining unit determines that the first video is not being recorded, restarting the requiring of the bit stream of the first video, the decoding and rendering of the first video.

In an embodiment of the application, the instruction obtaining unit 100 is specifically configured for: obtaining a bit stream type switch instruction for a first video being played;

the video processing unit 300 is further configured for continuing the decoding and rendering of the first video.

Figure 5:
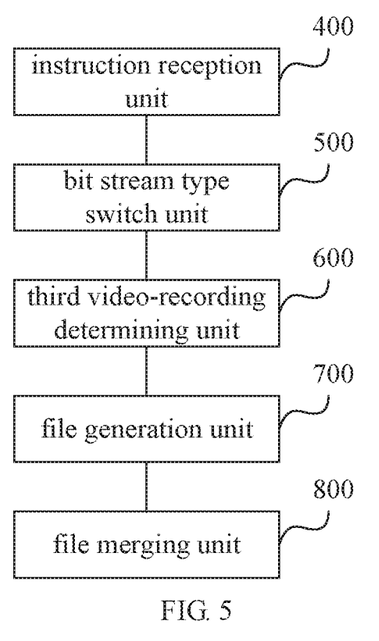
FIG. 5 is another schematic structural diagram of an apparatus for processing a video playing according to an embodiment of the application.

In an embodiment of the application, referring to FIG. 5, the apparatus according to FIG. 4 may further include:

an instruction reception unit 400, configured for receiving a bit stream type forced-switch instruction input by a user;

a bit stream type switch unit 500, configured for switching the bit stream type of the first video to a target bit stream type in the bit stream type forced-switch instruction;

a third video-recording determining unit 600, configured for determining whether the first video is being recorded;

a file generation unit 700, configured for, when the third video-recording determining unit 600 determines that the first video is being recorded, generating a video-recording file for the first video based on a video that is recorded based on the bit stream type of the first video, and acquiring and storing the bit stream of the first video based on the target bit stream type; and a file merging unit 800, configured for, after the recording of the first video is closed, obtaining and merging all of the video-recording files for the first video.

With the above-mentioned embodiment, an adjustment instruction for a first video being played is obtained; whether the first video is being recorded is determined; if the first video is being recorded, a bit stream of the first video is acquired and stored based on a current bit stream type of the first video. It can be seen that the acquiring of the bit stream of the first video being-recorded will not be stopped, that is, the recording of the first video will not be stopped, ensuring the complete recording of the video.

An embodiment of the application further provides an electronic device. The electronic device includes a processor and a memory.

The memory is configured for storing an application program.

The processor is configured for executing the application program stored in the memory, so as to implement the method for processing video playing. The method for processing video playing includes:

obtaining an adjustment instruction for a first video being played;

determining whether the first video is being recorded; and if the first video is being recorded, acquiring and storing a bit stream of the first video based on a current bit stream type of the first video.

With the above-mentioned embodiment, an adjustment instruction for a first video being played is obtained; whether the first video is being recorded is determined; if the first video is being recorded, a bit stream of the first video is acquired and stored based on a current bit stream type of the first video. It can be seen that the acquiring of the bit stream of the first video being-recorded will not be stopped, that is, the recording of the first video will not be stopped, ensuring the complete recording of the video.

A communication bus may be PCI (Peripheral Component Interconnect) bus, EISA (Extended Industry Standard Architecture) bus or the like. This communication bus may include an address bus, a data bus, a control bus, and the like.

A communication interface is configured for achieving communication between the above-mentioned electronic device and other devices.

The memory may include RAM (Random Access Memory), or may include NVM a (Non-Volatile Memory), for example at least one disk memory. Optionally, the memory may further be at least one storage apparatus located away from the above-mentioned processor.

The above-mentioned processor may be a general processor including CPU (Central Processing Unit), NP (Network Processor) and the like. The above-mentioned processor may further be DSP (Digital Signal Processing), ASIC (Application Specific Integrated Circuit), FPGA (Field-Programmable Gate Array) or other programmable logic components, discrete gate or transistor logic component, discrete hardware assembly.

An embodiment of the application further provides an application program which, when executed, implements the method for processing video playing. The method for processing video playing includes:

obtaining an adjustment instruction for a first video being played;

determining whether the first video is being recorded; and if the first video is being recorded, acquiring and storing a bit stream of the first video based on a current bit stream type of the first video.

With the above-mentioned embodiment, an adjustment instruction for a first video being played is obtained; whether the first video is being recorded is determined; if the first video is being recorded, a bit stream of the first video is acquired and stored based on a current bit stream type of the first video. It can be seen that the acquiring of the bit stream of the first video being-recorded will not be stopped, that is, the recording of the first video will not be stopped, ensuring the complete recording of the video.

An embodiment of the application further provides a storage medium configured for storing an application program which, when executed, implements the method for processing video playing. The method for processing video playing includes:

obtaining an adjustment instruction for a first video being played;

determining whether the first video is being recorded; and if the first video is being recorded, acquiring and storing a bit stream of the first video based on a current bit stream type of the first video.

With the above-mentioned embodiment, an adjustment instruction for a first video being played is obtained; whether the first video is being recorded is determined; if the first video is being recorded, a bit stream of the first video is acquired and stored based on a current bit stream type of the first video. It can be seen that the acquiring of the bit stream of the first video being-recorded will not be stopped, that is, the recording of the first video will not be stopped, ensuring the complete recording of the video.

The embodiments of the apparatus for processing video playing, the electronic device, the application program, the storage medium are described briefly since they are substantially similar to the embodiment of the method for processing video playing. Related contents refer to the part that describes the embodiment of the method for processing video playing shown in FIGS. 1-3.

It should be noted that the relationship terms used herein, such as "first", "second" and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that is not specifically listed or the elements intrinsic to these processes, methods, articles, or devices. Without further limitations, elements defined by the wording "comprise(s) a/an . . . " and "include(s) a/an . . . " do not exclude additional identical elements in the processes, methods, articles, or devices that includes the listed elements.

It can be understood by those with ordinary skills in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferred embodiments of the application, and are not intended to limit the scope of protection of the application. Any modifications, alternatives, improvements, or the like within the spirit and principle of the application shall be included in the scope of protection of the application.

The invention claimed is:

1. A method for processing video playing, comprising:
   obtaining a split screen mode switch instruction;
   when the number of split screens corresponding to a target split screen mode in the split screen mode switch instruction is smaller than the number of split screens corresponding to a current split screen mode, determining that a first video(s) being played that is to be hidden exists;
   if the first video(s) being played that is to be hidden exists, generating a hiding instruction for each of the first video(s); and
   when the first video(s) is being recorded, acquiring and storing a bit stream of the first video(s) based on a current bit stream type of the first video(s), and stopping the decoding and rendering of the first video(s).

2. The method of claim 1, wherein, when a hidden first video is displayed, the method further comprises:
   determining whether the hidden first video is being recorded;
   if the hidden first video is being recorded, recovering the decoding and rendering of the hidden first video, wherein the acquiring of the bit stream of the hidden first video is ongoing during the recording of the hidden first video; and
   if the hidden first video is not being recorded, restarting the acquiring of the bit stream of the hidden first video, the decoding and rendering of the hidden first video.

3. The method of claim 1,
   further comprising:
   obtaining a bit stream type switch instruction for a video being played in a split screen; and
   when the video being played corresponding to the bit stream type switch instruction is being recorded, acquiring and storing a bit stream of this video being played based on a bit stream type of this video being played before the acquiring of the bit stream type switch instruction, and continuing the decoding and rendering of this video being played.

4. The method of claim 1, further comprising:
   receiving a bit stream type forced-switch instruction input by a user for a video being played;
   switching a bit stream type of the video being played corresponding to the bit stream type forced-switch instruction to a target bit stream type in the bit stream type forced-switch instruction;
   determining whether the video being played corresponding to the bit stream type forced-switch instruction is being recorded; and
   if the video being played corresponding to the bit stream type forced-switch instruction is being recorded, generating a video-recording file for this video being played based on a video that is recorded based on a bit stream type of this video being played, and acquiring and storing the bit stream of this video being played based on the target bit stream type; and
   after the recording of the video being played corresponding to the bit stream type forced-switch instruction is closed, obtaining and merging all of the video-recording files for this video being played.

5. A non-transitory storage medium, configured for storing an application program which, when executed, implements the method for processing video playing of claim 1.

6. An electronic device, comprising a memory and a processor, wherein,
   the memory is configured for storing an application program; and
   the processor is configured for executing the application program stored in the memory, so as to perform operations of:
   obtaining a split screen mode switch instruction;
   when the number of split screens corresponding to a target split screen mode in the split screen mode switch instruction is smaller than the number of split screens corresponding to a current split screen mode, determining that a first video(s) being played that is to be hidden exists;
   if the first video(s) being played that is to be hidden exists, generating a hiding instruction for each of the first video(s); and
   when the first video(s) is being recorded, acquiring and storing a bit stream of the first video(s) based on a current bit stream type of the first video(s), and stopping the decoding and rendering of the first video(s).

7. The electronic device of claim 6, wherein, when a hidden first video is displayed, the processor is further caused to perform operations of:

determining whether the hidden first video is being recorded;

if the hidden first video is being recorded, recovering the decoding and rendering of the hidden first video, wherein the acquiring of the bit stream of the hidden first video is ongoing during the recording of the hidden first video; and if the hidden first video is not being recorded, restarting the acquiring of the bit stream of the hidden first video, the decoding and rendering of the hidden first video.

8. The electronic device of claim 6, wherein, the processor is further caused to perform operations of:

obtaining a bit stream type switch instruction for a video being played in a split screen; and when the video being played corresponding to the bit stream type switch instruction is being recorded, acquiring and storing a bit stream of this video being played based on a bit stream type of this video being played before the acquiring of the bit stream type switch instruction, and continuing the decoding and rendering of this video being played.

9. The electronic device of claim 6, the processor is further caused to perform operations of:

receiving a bit stream type forced-switch instruction input by a user for a video being played;

switching a bit stream type of the video being played corresponding to the bit stream type forced-switch instruction to a target bit stream type in the bit stream type forced-switch instruction;

determining whether the video being played corresponding to the bit stream type forced-switch instruction is being recorded; and if the video being played corresponding to the bit stream type forced-switch instruction is being recorded, generating a video-recording file for this video being played based on a video that is recorded based on a bit stream type of this video being played, and acquiring and storing the bit stream of this video being played based on the target bit stream type; and after the recording of the video being played corresponding to the bit stream type forced-switch instruction is closed, obtaining and merging all of the video-recording files for this video being played.

* * * * *